Patented June 3, 1930

1,761,116

UNITED STATES PATENT OFFICE

KARL GEISEL, OF LEVALLOIS-PERRET, FRANCE, ASSIGNOR, BY MESNE ASSIGNMENTS, TO ALUMINUM SOLDER CORPORATION OF AMERICA, OF NEW YORK, N. Y., A CORPORATION OF DELAWARE

COMPOSITION FOR SOLDERING METALS

No Drawing. Application filed May 28, 1928, Serial No. 281,364, and in Germany February 20, 1928.

This invention relates to a composition for soldering metallic parts, particularly aluminum and any or all of its alloys.

It is well known that heretofore considerable difficulties were experienced in uniting metallic parts, such as aluminum, or its alloys, that is to say it was extremely difficult to join such bodies firmly together either by the method of dissolving the metal atoms or by soldering. And although various compositions, agents and mixtures, for example powder composed from chemical materials have been proposed for this purpose, these compositions were inadequate or completely unsuitable for obtaining the desired or necessary results.

The object of the present invention is to provide a composition, which is particularly suitable for soldering sheets, plates, hollow bodies and fine cast parts of metals composed of aluminum, or its alloys, and which, in the form of powder, is particularly suitable for soldering massive bodies made from the said metals.

The new product has proven to be a thoroughly successful and useful soldering agent and its use overcomes the difficulties heretofore encountered. While the product is particularly adapted for use with aluminum or the like, to form strong and effective soldered joints, its use is not limited to such metals but it has been proven equally successful when used for soldering other metals, for example iron, brass, copper, and various other metals and metallic alloys. Moreover, the composition is even more efficient for its intended purpose when any of the so-called common metals are to be united with the aluminum or aluminum alloys. In any case, however, it is quite immaterial whether the metals treated with the composition belong to the same class or whether they are divergent in nature, as the joints produced remain permanent, unaffected by weather, acids and the like, and are even unbreakable when subjected to relatively high forces, however applied. The sphere of use of the product for soldering metallic bodies may therefore be said to be unlimited.

A satisfactory composition of the new product, given by way of example, is as follows: 90 parts by weight of zinc chloride, 8 parts by weight of ammonium bromide, 2 parts by weight of sodium fluoride.

The relative proportions of these substances may, however, be varied as desired and such proportions are selected according to particular requirements and according to the particular metals to be soldered. Moreover other chemical substances or similar agents may be added to the product composed as above set forth or may be eliminated therefrom in appropriate proportions and within certain limits. For example, substances, separately or in combination, such as metallic powder, etching materials, oxidizing or reducing fluids or such bodies or gases and so forth may be admixed, in subsidiary or auxiliary processes before, during or after the mixing process proper, all within the scope of the invention.

The melting point of the pulverulent soldering substance is about 190° Celsius.

The new soldering agent is employed in the following manner:

The parts to be united are cleaned and the powder is applied and heated by means of a flame or over an open fire or the like. After a few seconds the powder melts, becoming grayish and then immediately assumes a bluish colour with the formation of a cloud-like vapour, immediately after which a final light-silver tint is produced. The solder seam is now ready and can be cooled either slowly or quickly.

The action of the composition seems to be that first the surface skin of the metallic parts to be united is subjected to a reducing action by which any oxides that may be present in such skin are substantially completely reduced to the pure metal. As the heating of the powder proceeds the salts are apparently decomposed. The reducing of the surface skin of the metals to pure metal and the simultaneous decomposition of the zinc chloride, which it will be noted forms the largest part of the composition, results in the formation of a molecular bond between the zinc and the metals of the parts united. Exhaustive tests have demonstrated that the joint produced possesses greater tensile, shearing and compression strength than that of any of the metals which it unites, and moreover that the joint is more resistive to corrosion than such metals.

I claim:—

1. A composition for soldering metals, particularly aluminum and its alloys, consisting of a mixture of zinc chloride, ammonium bromide and sodium fluoride.

2. A composition for soldering metals, particularly aluminum and its alloys, consisting of a mixture of a major part of zinc chloride, and a minor part of ammonium bromide and sodium fluoride.

3. A composition for soldering metals, particularly aluminum and its alloys consisting of 90 parts by weight of zinc chloride, 8 parts by weight of ammonium bromide, and 2 parts by weight of sodium fluoride.

4. A composition for soldering metals, particularly aluminum and its alloys, consisting of a mixture of zinc chloride, ammonium bromide and sodium fluoride in such proportions that the composition will have a soldering temperature of 190° C.

In testimony whereof I have hereunto set my hand.

KARL GEISEL.